(12) United States Patent
Lystad et al.

(10) Patent No.: US 7,577,554 B2
(45) Date of Patent: Aug. 18, 2009

(54) WORKFLOW MODELING USING AN ACYCLIC DIRECTED GRAPH DATA STRUCTURE

(75) Inventors: Garr S. Lystad, Denton, TX (US); Peng Zhao, Plano, TX (US)

(73) Assignee: i2 Technologies US, Inc., Dallas, TX (US)

( * ) Notice: Subject to any disclaimer, the term of this patent is extended or adjusted under 35 U.S.C. 154(b) by 774 days.

(21) Appl. No.: 11/120,588

(22) Filed: May 3, 2005

(65) Prior Publication Data
US 2005/0192783 A1 Sep. 1, 2005

Related U.S. Application Data

(63) Continuation of application No. 09/898,924, filed on Jul. 3, 2001, now abandoned.

(51) Int. Cl.
*G06F 7/60* (2006.01)
(52) U.S. Cl. ............... 703/2; 705/7; 705/8; 705/9; 705/10; 717/100; 717/101; 717/104
(58) Field of Classification Search ............... 703/2; 705/8, 9; 715/255; 717/100, 101
See application file for complete search history.

(56) References Cited

U.S. PATENT DOCUMENTS

| | | | | |
|---|---|---|---|---|
| 5,229,936 A * | 7/1993 | Decker et al. | ................ | 704/10 |
| 5,826,239 A * | 10/1998 | Du et al. | ................ | 705/8 |
| 6,009,405 A * | 12/1999 | Leymann et al. | ................ | 705/9 |
| 6,038,538 A * | 3/2000 | Agrawal et al. | ................ | 705/7 |
| 6,041,306 A * | 3/2000 | Du et al. | ................ | 705/8 |
| 6,266,053 B1 * | 7/2001 | French et al. | ................ | 715/255 |
| 6,307,964 B1 * | 10/2001 | Lin et al. | ................ | 382/203 |
| 6,400,846 B1 * | 6/2002 | Lin et al. | ................ | 382/199 |
| 6,725,445 B1 * | 4/2004 | Leymann et al. | ................ | 717/101 |
| 6,772,407 B1 * | 8/2004 | Leymann et al. | ................ | 717/100 |
| 6,804,634 B1 * | 10/2004 | Holzmann et al. | ................ | 703/2 |
| 6,816,902 B1 * | 11/2004 | Bandat et al. | ................ | 709/226 |
| 6,826,579 B1 * | 11/2004 | Leymann et al. | ................ | 717/131 |
| 7,024,669 B1 * | 4/2006 | Leymann et al. | ................ | 718/100 |
| 7,024,670 B1 * | 4/2006 | Leymann et al. | ................ | 718/102 |
| 2002/0062463 A1 * | 5/2002 | Hines | ................ | 714/38 |

OTHER PUBLICATIONS

Padmos, Jeremy et al., "How i2 Integrates Simulation in Supply Chain Optimization," Proceedings of the 1999 Winter Simulation Conf., 1999, pp. 1350-1355, i2 Technologies, USA.

* cited by examiner

*Primary Examiner*—Hugh Jones
*Assistant Examiner*—Cuong V Luu
(74) *Attorney, Agent, or Firm*—Booth Udall, PLC; Steven J. Laureanti

(57) ABSTRACT

A process for modeling at least a portion of a workflow includes accessing a computer data structure to represent an acyclic directed graph (10) including multiple nodes (12) and one or more edges (14), each edge (14) linking two adjacent nodes (12). The value of a function at a selected node (12) is requested, the value of the function at the selected node (12) depending on values of the function at one or more adjacent nodes (12) lying in a first direction from the selected node (12). If a cached value of the function at the selected node (12) is not assured to be valid, then the value of the function at the selected node (12) is recomputed based on the values of the function at the one or more adjacent nodes (12) and then returned. If the cached value is assured to be valid, then the cached value is returned without recomputing the value of the function at the selected node (12).

20 Claims, 6 Drawing Sheets

WORKFLOW MODELING USING AN ACYCLIC DIRECTED GRAPH DATA STRUCTURE

CROSS-REFERENCES TO RELATED APPLICATIONS

This application is a Continuation of U.S. patent application Ser. No. 09/898,924 filed on Jul. 3, 2001, now abandoned which is hereby incorporated by reference.

TECHNICAL FIELD OF THE INVENTION

This invention relates in general to logistics planning, and more specifically to a technique for workflow modeling using an acyclic directed graph data structure.

BACKGROUND OF THE INVENTION

Allocation of resources, which may include tangible resources (such as raw materials, component parts, equipment, and labor) or intangible resources (such as processing time and cost allocation), typically poses many challenges in commercial or other enterprises. Given the myriad ways in which available resources may be allocated in connection with activities of a particular enterprise, and the fact that resource allocation schemes may differ widely as to their efficacy (in terms of their ability to maximize output, profit, or other desired performance measures), complex systems for logistics planning have been developed. Such logistics planning systems have been advantageously employed in, for instance, the manufacture of a product within a factory.

As computer processing power and data storage have become increasingly affordable, and as algorithms for logistics planning have exploited this availability, many logistics planning capabilities for manufacturing and other environments have been implemented using computer-based techniques. In considering analysis of a manufacturing process for a particular product, for example, it may be necessary to account for one or more materials that will be employed in assembling, fabricating, processing, synthesizing, or in otherwise producing the product. However, previous logistics planning techniques have been suboptimal in that they have not typically employed intelligent methods to reduce the amount of computer processing required to attain a desired level of accuracy in modeling a particular workflow or estimating critical time points within a workflow. Since the availability of computer processing resources may significantly limit the speed with which workflow modeling tasks may be performed or may limit the complexity that may be considered in performing the tasks, previous techniques have been inadequate for many needs.

SUMMARY OF THE INVENTION

According to the present invention, disadvantages and problems associated with previous workflow modeling techniques are reduced or eliminated.

In one embodiment of the present invention, a process for modeling at least a portion of a workflow includes accessing a computer data structure that represents an acyclic directed graph including multiple nodes and one or more edges, each of the edges linking two adjacent nodes within the acyclic directed graph. The value of a first function at a selected node is requested, the value of the first function at the selected node depending at least in part on values of the first function at one or more adjacent nodes lying in a first direction from the selected node. It is determined whether a cached value of the first function at the selected node is assured to be valid. If the cached value of the first function at the selected node is not assured to be valid, then the value of the first function at the selected node is recomputed based at least in part on the values of the first function at the one or more adjacent nodes and then returned. If the cached value of the first function at the selected node is assured to be valid, then the cached value of the first function at the selected node is returned without recomputing the value of the first function at the selected node.

Particular embodiments of the present invention may provide one or more important technical advantages. The present invention provides an acyclic directed graph structure and associated technique for reducing unnecessary recalculations of workflow-related values in a workflow model. Unnecessary recalculations may be reduced by determining which of possibly numerous changes in workflow data may require, and which do not require, recalculation of previously-calculated values. As an example, the present invention may be used to estimate critical times within a workflow, such as the earliest possible or latest possible starting or ending times for one or more manufacturing operations. Previously calculated workflow values (such as critical times) may be intelligently cached to reduce the need to recalculate such values in response to non-critical changes in other workflow data. One or more of these benefits may significantly reduce demands on computational resources, allow associated software to complete tasks more quickly or consider more complexity in a given amount of time, or simplify the code of such software. The present invention may be advantageously used for modeling a wide variety of manufacturing of other workflows, in connection with any appropriate planning, scheduling, optimization, or other software. Other important technical advantages are apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
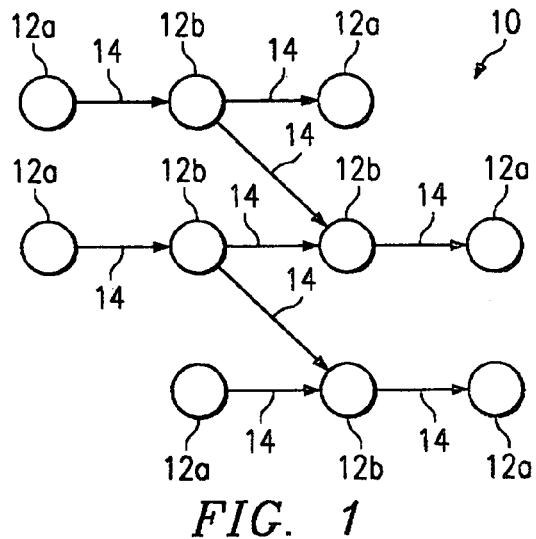
FIG. 1 illustrates an example acyclic directed graph structure modeling an example manufacturing process.

FIG. 1 illustrates an exemplary acyclic directed graph structure 10 that models and exemplary manufacturing process. Graph structure 10 includes one or more leaf nodes 12a and one or more non-leaf nodes 12b, referred to collectively as nodes 12. In planning the use of raw materials, parts, components, assemblies, or other materials within a manufacturing process, it is typical to create a conceptual workflow model that may be represented as such an acyclic directed graph. The planned flow of materials is represented by edges 14 that connect nodes 12. Each edge 14 represents an assignment ("pegging") of materials from a preceding node 12 to a succeeding node 12. The flow of materials over time provides a time-oriented directionality for graph structure 10. The direction relating to a later time in the manufacturing process may be referred to as the "downstream" direction, while the opposite direction relating to an earlier time in the manufacturing process may be referred to as the "upstream" direction. That is, one may view graph structure 10 as modeling the manufacture of a product as a flow of materials, for example, from one or more raw materials to one or more finished products. The flow of materials in graph structure 10 may be in the direction of increasing value (for example, from left to right in a conventional linear timeline) or in the opposite direction, as appropriate according to particular needs.

One or more perimeter nodes 12a (not having any upstream nodes 12) may represent sources of materials such as raw materials, inventory, work-in-progress, purchase orders, or future procurements from vendors. One or more other perimeter nodes 12a (not having any downstream nodes 12) may represent customer orders for a product being manufactured. In the illustrated embodiment, the material source nodes 12a are shown at the left of graph structure 10 and customer order nodes 12a are shown at the right of graph structure 10. Depending on the workflow modeling being performed, either material source nodes 12a or customer order nodes 12a may be considered "leaf" nodes 12a within the graph structure 10. Non-perimeter nodes 12b represent the planned manufacturing operations, each having one or more inputs and one or more outputs (represented by edges 14). Non-perimeter nodes 12b may be considered "non-leaf" nodes 12b. In one embodiment, a manufacturing operation 12b includes an appropriate sequence of one or more manufacturing steps, before a first of which all required input materials for the manufacturing operation 12b have been received, and after a last of which all output materials from manufacturing operation 12b have been produced. An output material from an operation 12b may be an input material for a succeeding operation 12b or may be a product supplied to a customer order 12a. Depending on the workflow modeling that is being performed, customer orders 12a may be considered root nodes 12 of the graph structure 10 (such as for calculating earliest possible starting and ending times, described below) or material sources 12a may be considered root nodes 12 of the graph structure 10 (such as for calculating latest possible starting and ending times, described below).

In the discussion above and that which follows throughout, reference is made to graph structure 10. While it is well known in the mathematical arts that visual depiction of data using computer-generated or other graphs can aid in understanding such data, the present invention is not limited to visually-discernable graphs. Those skilled in the art will appreciate that reference to graph structure 10 (or to nodes 12, edges 14, and other characteristics) are equally applicable whether or not a visually-discernable graph is actually generated in connection with any particular part of the modeling process. Graph structure 10 is meant to be a logical construct and might only be notionally referred to or relied upon in connection with associated values or characteristics that would be depicted if a graph were actually generated.

Conceptualizing workflows using nodes 12 of graph structure 10 may allow substantial flexibility in the workflow modeling process. Nodes 12 in graph 10 need only represent some conceptual objects, depending on the workflow problem being solved. As an example, non-leaf nodes 12b may represent manufacturing operations that receive one or more input materials, perform one or more manufacturing steps using these materials, and produce one or more output materials as a result of the manufacturing steps. Such manufacturing operations 12b may involve, for example, mixing certain ingredients and baking that mixture to produce cookies, assembling integrated circuits and other components to produce one or more operational circuit boards, placing cans of soda in plastic holders to produce one or more "six packs," or any other suitable workflow operations. As noted above, the present invention is not limited to manufacturing workflows, but encompasses any appropriate workflow that includes one or more inputs, one or more processing steps, and one or more outputs, according to particular needs.

Furthermore, the present invention may be applied to any suitable resource-allocation process in which multiple resources (tangible, intangible, or mixed) are deployed, combined, or otherwise used to produce a desired result. Although the present invention is primarily described in terms of "materials," as an example of physical resources, those skilled in the art will appreciate that resources used as workflow elements may include any suitable tangible, intangible, or mixed resources, including but not limited to material input, mechanical processing and/or decision-making input, and human labor and/or decision-making input.

A manufacturing operation 12b cannot start until all required input materials are present at the mixing vat, assembly station, packaging machine, or wherever else the processing of the materials in connection with operation 12b begins. Assuming required equipment, labor, and other resources are available, the time at which all input materials are available is the earliest possible start time (EPST) for operation 12b. More broadly, the EPST for a node 12 is the time at which an associated group of workflow elements becomes available for use. The earliest possible end time (EPET) for a manufacturing operation 12b is the EPST for the operation 12b plus a runtime for the operation 12b, where the runtime is the time it takes to produce the output materials once operation 12b begins. More broadly, the EPET for node 12 is the time at which the processing or other use of an associated group of workflow elements is complete. Using the above examples, the EPET might be the time, for instance, that the cookies come out of the oven, the one or more circuit boards are fabricated, the one or more six packs are assembled, or processing at operation 12b has otherwise been completed. For a material source 12a, the EPET is typically a stored time (within the node 12a or otherwise) that represents the time at which the associated material will arrive or the present time if the material is already present. Customer orders 12a do not typically have defined EPETs.

The runtime for an operation 12b may reflect any number of constraints, such as a queuing time beforehand, processing times at one or more pieces of equipment used in connection with the operation 12b, how efficiently a piece of equipment is operating, maintenance schedules, or any other appropriate constraints. The runtime might also include a "cooldown" time, following completion of the processing steps for operation 12b, that must elapse before the output materials can be transported or otherwise made available to a succeeding node 12. A particular contribution to the runtime may be static or may be proportional to the amount of input materials being processed or output materials being produced. In general, information regarding the runtime for a particular operation 12b will be most readily available to the entity that is modeling the associated workflow. Those of ordinary skill in the art are able to specify runtimes for a workflow being modeled with sufficient accuracy to use the present invention advantageously.

The EPET for an operation 12b therefore depends on the EPST for operation 12b as well as the runtime for operation 12b. The EPST for operation 12b in turn depends on the availability of the associated input materials, as determined by the EPETs of one or more preceding or upstream nodes 12 from which input materials arrive. For example, fabrication of a circuit board cannot begin until all necessary integrated circuits and other components have themselves been produced, procured, and otherwise made available. Each input material may be available at a different time. In one embodiment, the EPST for a current node 12 is the maximum, over all adjacent upstream nodes 12, of the sum of the EPET of adjacent upstream node 12 and any transportation time for materials to travel from that adjacent upstream node 12 to the current node 12.

A noteworthy aspect of the EPST is that, because the latest of the arrival times for all the input materials needed for operation 12b is rate-determining, the arrival times for one or more other input materials may change to at least a certain degree without affecting the overall EPST (unless an arrival time changes so as to be later than the arrival time for the previously latest-arriving input material). Thus, unless there is a new latest arrival time, even though other input material arrival times may have changed, there is no need to recalculate the EPST or associated EPET for the operation 12b. According to the present invention, workflow modeling software may determine when it is necessary to recalculate such an EPST or EPET and when it is not, conserving computing resources where unnecessary recalculations are avoided and providing an important technical advantage.

Although the advantages of the present invention may be especially desirable in the case of workflow values, such as EPST and EPET, that are typically relatively computationally-expensive to calculate, the present invention is not limited to these particular workflow values. Techniques of the present invention for determining and eliminating unnecessary recalculations may be applied to any appropriate workflow modeling process in which intelligent discrimination is made between "critical" input variable changes (i.e. changes that require updating of at least some other variables or outputs) and "non-critical" input variable changes (i.e. changes that do not require any updating of other variables or outputs). Furthermore, the present invention may be applied in connection with any suitable planning, scheduling, optimization, or other software in which workflow modeling is performed.

To take another example, in discussing latest possible starting times (LPSTs) and latest possible ending times (LPETs) within a workflow, non-leaf nodes 12b may still represent manufacturing operations, but in this example the directionality of the graph structure 10 is reversed such that material sources 12a serve as root nodes 12 for the graph structure 10 rather than customer orders 12a. To estimate an LPET, one seeks to determine the latest possible ending time for manufacturing operation 12b that will not make any later-occurring (downstream) operation 12b or customer order 12a late. More broadly, the LPET for a current node 12 reflects that processing needs to end at node 12 soon enough to produce output materials in time to satisfy all adjacent downstream nodes 12 which current node 12 supplies. In one embodiment, the LPET for a current node 12 is the minimum, over all adjacent downstream nodes 12, of the LPST of the adjacent downstream node 12 minus any transportation time for materials to travel from the current node 12 to that adjacent downstream node 12. The LPST for the current node is the LPET for the current node 12 minus the runtime for the current node 12. For customer orders 12a, the LPST is typically a stored time (within node 12a or otherwise) equal to the due date for customer order 12a. Material sources 12a do not typically have defined LPSTs.

Analogous to the EPSTs described above, an LPET (and thus the associated LPST) may be affected by some changes to downstream LPSTs and unaffected by others. Therefore, even if one or more downstream LPSTs change, it may often be unnecessary to recalculate all the LPSTs upstream, since most of these previously-calculated LPSTs may still be entirely valid. The present invention allows LPSTs (and associated LPETs) that are still valid to be retained while only recalculating the LPSTs (and associated LPETs) that may have become invalid. This may be desirable since, like the calculations of EPSTs and their associated EPETs, LPST and LPET calculations are typically relatively computationally-expensive to perform.

As the above discussion indicates, a similar approach may be used to reduce the number of recalculations of both earliest possible or latest possible times within the particular workflow of interest (such times being just an example of the values contemplated by the present invention). In the examples discussed above, and more generally, the value of a particular function at node 12 depends on the values of the same function at adjacent nodes 12. The value of the function at the node 12 will typically be subject to change as planning proceeds.

For example, flow of materials between two nodes 12 may be represented by an edge 14 that connects the nodes 12. A change in workflow planning might, for example, involve a decision to obtain an input material used in connection with an operation 12b from a different material source 12a than was previously planned or a decision to change the relative amounts of input materials used in connection with operation 12b. When one or more edges 14 associated with a node 12 are removed and/or added to reflect such a change, all the EPSTs downstream and all the LPSTs upstream of node 12 may run the risk of becoming invalid. However, the values are not all necessarily invalidated, such that an intelligent discrimination between any EPSTs and LPSTs that are at risk of being invalid (and may need to be recalculated) and those that are not at risk (and will not need to be recalculated) may conserve computational resources. Furthermore, replanning may occur in response to changes in the times at which one or more source materials 12a arrive (based on unforeseen delays in material delivery, incomplete material delivery, equipment breakdown, and the like) or on which customer orders 12a are due. Those skilled in the art readily appreciate that any appropriate change in the workflow model may affect EPST and LPST values at one or more nodes 12. Although EPSTs, EPETs, LPSTs, and LPETs are discussed, the above discussion may be equally applicable to any other suitable workflow values in any suitable workflow context.

Although it may often be desirable to maintain currently accurate (or at least approximately accurate) values within a workflow model being used for planning, scheduling, optimization, or other tasks, providing sufficient accuracy using previous techniques has typically required frequent recalculation of these values. This has in many instances detracted from the convenience, cost effectiveness, and usability of systems incorporating such techniques.

Even with the ever increasing availability of relatively inexpensive computer processing resources, calculations of values such as those described above can be quite lengthy and costly. In this context, those skilled in the art will appreciate that "excessive" or otherwise unnecessarily costly calculations or computing steps may include any additional calculations or computing steps beyond the minimum that is sufficient for reasonably accurate modeling of the applicable workflow. Complex workflow modeling, even under the best circumstances, may take a comparatively long time. Although computations for any given step of the workflow modeling process, such as recalculation of a value described above, may require only a small fraction of a second, such recalculations may be performed many millions of times during the workflow modeling process, such that the aggregate computational time may be significant.

One reason that it often takes significant aggregate time to perform these computations is that the workflow being modeled may have many operations within or associated with each node 12. As an example, each operation 12b is typically associated with one or more pieces of equipment. For each piece of equipment, it might be necessary to determine how quickly the equipment can process work in association with operation 12b, whether the time at which the equipment is needed has been scheduled for maintenance or other down time, whether the equipment has different availability or working states, or any other suitable information relating to the use of the equipment in connection with operation 12b. As a more particular example, consider the case of a workflow resource that is a paint-spraying room. If the workflow involves parts that need to be painted a first color, painting parts that first color requires a minimum time for switching the paint supply within the room from a second color used for a previous operation 12b to the first color and also to clean painting equipment, and the switching time varies depending on the previous color, it may be necessary to first determine what second color is being used for the previous operation 12b and then determine when the current operation 12b can begin using the first color. Such computations take time to perform and are preferably performed infrequently if possible. The present invention provides a technique to reduce the number of times that certain functions (some of which fit the pattern of EPSTs, EPETs, LPSTs, and LPETs described above) must be computed for a given workflow.

For the sake of definiteness and brevity, the illustrative discussion that follows is worded in terms of a particular embodiment of the invention useful for achieving a reduction in the number of computations of EPETs within a workflow incorporating appropriate manufacturing operations 12b. Downstream will refer to one direction within graph structure 10 and upstream will refer to the opposite direction within graph structure 10, corresponding to later and earlier stages, respectively, of a time-oriented workflow. However, as discussed above, the present invention is meant to encompass any suitable workflow values according to particular needs.

In one embodiment, for each operation 12b, the present invention employs a set of four variables and a set of four methods (i.e. node-local functions) used for manipulating these variables in order to avoid unnecessary calls to the function that computes the EPET. For purposes of simplicity, the variables associated with an operation 12b are referred to as "EPET_cache," "EPST_cache," "check_EPET," and "check_EPST." In certain embodiments, following initialization of these variables (setting their initial values), it is desirable to set values of these variables using only the methods described below. Each operation 12b may contain a list of upstream edges 14 and a list of downstream edges 14 coupled to operation 12b. The lists may be integrated or separate. Each material source 12a contains the time the associated material becomes available and each customer order 12a contains the time that the associated order is due.

In one embodiment, the EPET_cache and EPST_cache variables are caches (which hold the EPET and EPST values, respectively, for the associated operation 12b). The check_EPET and check_EPST are Boolean (i.e. true/false) variables, referred to where appropriate as flags. Each flag is associated with one of the caches and is used to indicate whether the cache to which it corresponds should not be trusted to hold the correct value. In one embodiment, the check_EPST flag may be used as a warning when an element of the workflow upstream (e.g., availability of a particular input material) has changed, to indicate that such change has occurred but also that it is not yet known whether such change will actually affect the associated EPST or EPET. The check_EPET flag may be used less often, being invoked when necessary to indicate that the associated EPET_cache value is likely to be incorrect, for example, when the check_EPST flag is not currently indicating this (when the EPST_cache is suspect the EPET_cache on which depends will be also).

The four methods corresponding to each variable set in one embodiment will be referred to below as the "get_EPET," "get_EPST," "set_check_EPET_true," and "set_check_EPST true" methods for increased simplicity. In general, the get_EPET and get_EPST methods update the associated cache (e.g., the EPET_cache for the get_EPET) method when appropriate and return the current (possibly updated) value of the cache. The set_check_EPET_true and set_check_EPST_true methods set the associated logic state flags to "true" so that the get_EPET and get_EPST methods will have reliable information as to which caches may not be trusted to contain correct values. The present invention contemplates any of the methods being called by any suitable code within the planning, scheduling, optimization, or other system in which the workflow modeling occurs, a value or other suitable result of the function call being returned by the called method to that code where appropriate.

Although the following description will use terminology typically associated with an object-oriented software implementation, the present invention contemplates any suitable programming language and software development technique. As just an example, although "methods" are primarily described, the present invention may be described in an equally suitable manner using "functions" or the like. Similarly, each "call" to a method may be described in any equally suitable manner as a "message" sent to a node 12. Those skilled in the art will appreciate that the present invention encompasses all appropriate implementations and is not intended to be limited to a particular implementation through the use of such terminology.

In the following descriptions of example methods, as an aid to understanding, the node 12 on which a method is called will be referred to as "operation 12b" and any other node 12 upstream or downstream of that operation 12b (whether it be a material source 12a, operation 12b, or customer order 12a) will simply be referred to as "node 12." Although the methods are described as being called on operations 12b, one or more of these methods may be called on material sources 12a or customer orders 12a where appropriate.

Figure 2:
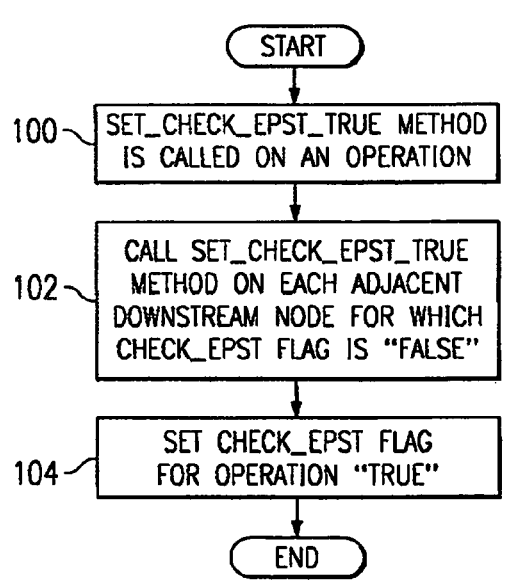
FIG. 2 illustrates an example process associated with the operation of a set_check_EPST_true function.

FIG. 2 illustrates an example process corresponding to operation of the set_check_EPST_true method. In one embodiment, this method should be called on an operation 12b by any code (except the get_EPET method) that is responsible for a possible change of the EPST value for operation 12b. This could be due to operation 12b gaining or losing an upstream edge 14, a change in the transportation time along an existing upstream edge 14, a change in the EPET for an adjacent upstream leaf node 12a (such as a material source 12a), or any other appropriate change. The code responsible for changing the EPET value of an upstream operation 12b, however, will preferably call the set_check_EPET_true method of upstream operation 12b which will in turn call the set_check_EPST_true method of operation 12b.

The process of FIG. 2 begins at step 100, where the set_check_EPST_true method is called on an operation 12b. Since a lack of confidence in an EPST value implies a lack of confidence in all downstream EPST_cache values, it is desirable to set the check_EPST flags of all downstream nodes 12 to "true" to indicate this. To accomplish this, at step 102, the set_check_EPST_true method recursively calls the set_check_EPST_true method of each adjacent downstream node 12 for which the check_EPST flag is "false." In one embodiment, since the check_EPST flags are all initially set "true," since only the get_EPST method sets a check_EPST flag "false" and does not do so until all upstream check_EPST flags are also set "false," and since only the set_check_EPET_true method sets a check_EPST flag "true" and does not do so until all downstream check_EPST flags are also set "true," it is apparent that all check_EPST flags downstream of a "true" check_EPST flag will also be "true" and all check_EPST flags upstream of a "false" check_EPST flag will also be "false."

At step 104, the set_check_EPST_true method sets the check_EPST flag for operation 12b to "true," and the process for this particular call to the method ends. When steps 102 and 104 are performed in this sequence (step 102 being performed before step 104), the statement concluding the preceding paragraph will hold true at all times during operation of the associated system. While reversing this sequence (step 104 being performed before step 102) might cause "lapses" in the truth of the statement, such lapses if any will typically not affect the outcome of calling the set_check_EPST_true method. Accordingly, when the set_check_EPST_true method encounters a check_EPST flag that is already "true" in its recursive descent through downstream nodes 12, it need go no further along that downstream path.

Figure 3:
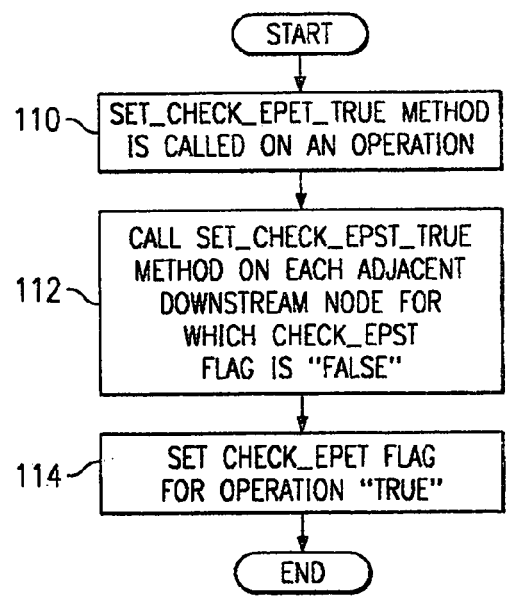
FIG. 3 illustrates an example process associated with the operation of a set_check_EPET_true function.

FIG. 3 illustrates an example process corresponding to operation of the set_check_EPET_true method. In one embodiment, this method should be called on operation 12b by any code (except the get_EPST method) that is responsible for a change in an input to the EPET calculation at operation 12b other than a possible change to the EPST value at the operation 12b. For example, the EPET may become invalid because of a change in the runtime of the associated operation 12b because operation 12b, is producing more of the material in than had been planned, different equipment is used that is faster than or slower than the equipment originally planned, additional equipment is used to reduce the processing time for a given quantity of material, or for any other reason or combination of reasons.

The process of FIG. 3 begins at step 110, where the set_check_EPET_true method is called on operation 12b. Since a lack of confidence in an EPET value implies a lack of confidence in all downstream EPST_cache and EPET_cache values, it is desirable to set the check_EPST flags of all downstream nodes 12 to "true" to indicate this. To accomplish this, at step 112, the set_check_EPET_true method preferably calls the set_check_EPST_true method on each adjacent downstream node 12 for which the check_EPST flag is "false." This will recursively set all the downstream check_EPST flags to "true." At step 114, the set_check_EPET_true method sets the check_EPET flag on operation 12b "true" and the process for this particular call to the set_check_EPET_true method ends.

Although downstream EPET_cache values are suspect also, the downstream check_EPET flags are preferably not set to "true" at this time. In one embodiment, any attempt to retrieve the EPET_cache value for a downstream node 12 through a call to the get_EPET method on node 12 will, as described below with reference to FIG. 5, result in a call to the get_EPST method on node 12. If the EPST_cache value changes at node 12, the get_EPST method will in turn set the check_EPET flag at node 12 to "true." However, if the EPST_cache value does not change at node 12, then the get_EPST method will not set the check_EPET flag at node 12 to "true." This may eliminate the need to compute the EPET value for the node 12, which may provide an important technical advantage.

Figure 4:
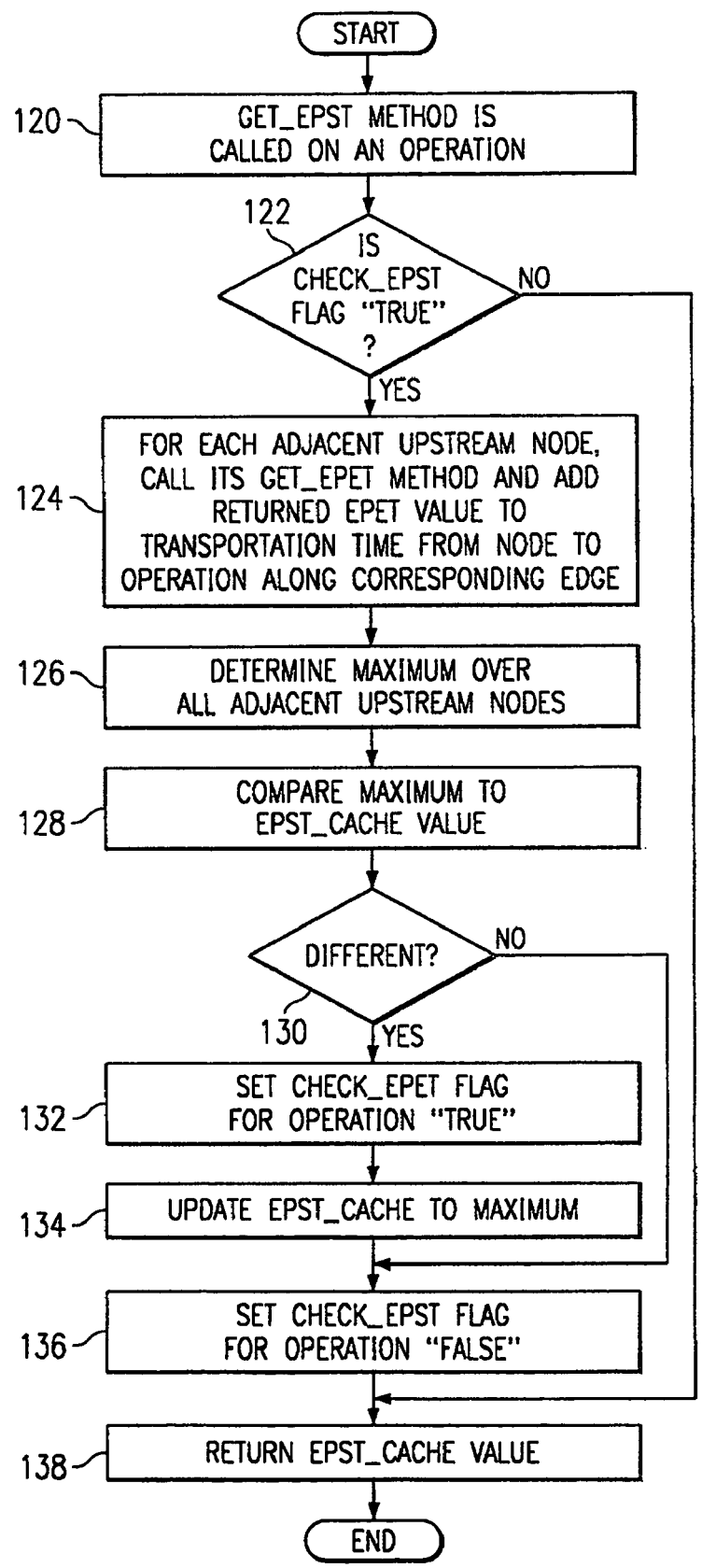
FIG. 4 illustrates an example process associated with the operation of a get_EPST function.

FIG. 4 illustrates an example process corresponding to operation of the get_EPST method. In general, the get_EPST method is called to return the EPST of the operation 12b on which it is called. The process begins at step 120, where the get_EPST method is called on operation 12b. At step 122, if the check_EPST flag for operation 12b is "false," then proceed to step 138, where the cached EPST value is simply returned without needing to be recomputed. This may provide an important technical advantage. Alternatively, if the check_EPST flag for the operation 12b is "true" at step 122 (indicating a change upstream of the operation 12b that may have affected its EPST value), then for each adjacent upstream node 12, the get_EPST method calls its get_EPET method and adds the returned EPET value for node 12 to the transportation time from node 12 to operation 12b along the corresponding edge 14 to generate a total at step 124. The maximum of the totals generated at step 124, over all adjacent upstream nodes 12, is determined at step 126 (possibly being stored as a temporary variable). The maximum will typically be the new EPST value for operation 12b.

To determine whether the maximum is in fact the new EPST for operation 12b, the get_EPST method compares the maximum to the cached EPST value for the operation 12b at step 128. Only if the maximum differs from the EPST_cache value is there a need to set the check_EPET flag "true" to indicate that the current EPET value may be invalid due to the changed EPST value. Therefore, if the maximum is different from the cached EPST value at step 130, the get_EPST method sets the check_EPET flag for operation 12b to "true" at step 132, updates the EPST_cache to the maximum at step 134, sets the check_EPST flag for operation 12b to "false" at step 136 since the EPST_cache value is now current, and returns the updated EPST value to the code that called the get_EPST method at step 138. Alternatively, if the maximum is not different from the cached EPST value at step 130, the check_EPST flag for operation 12b is set to "false" at step 136 and the previously cached EPST value (in this case still current) is returned at step 138. After the requested EPST value has been returned at step 138, the overall process for this particular call to the get_EPST method ends.

Figure 5:
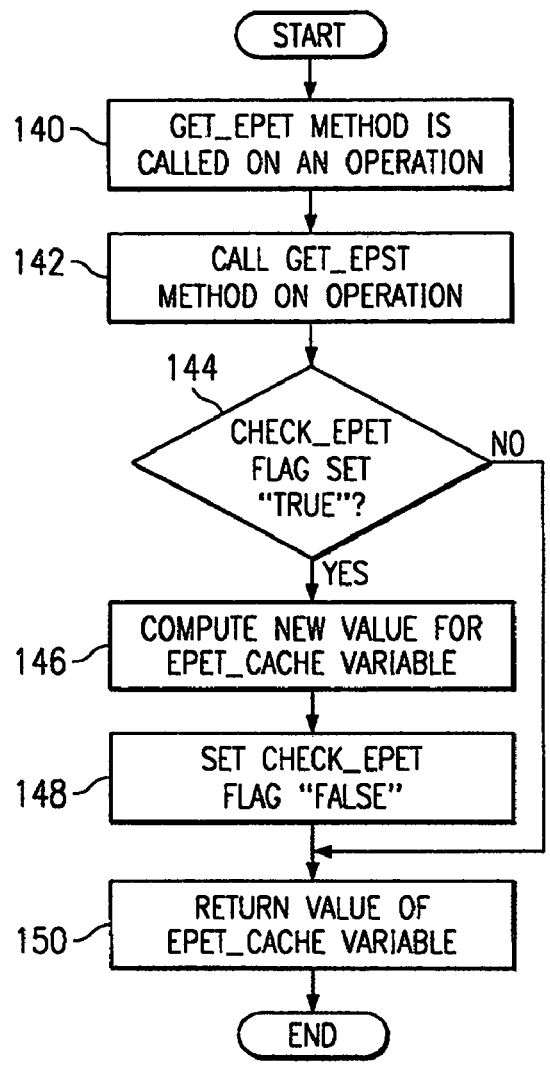
FIG. 5 illustrates an example process associated with the operation of a get_EPET function.

FIG. 5 illustrates an example process corresponding to operation of the get_EPET method. In general, the get_EPET method is called to return the EPET value for the operation 12 on which the method is called. The process begins at step 140, where the get_EPET method is called on an operation 12b. In response, at step 142, the get_EPET method calls the get_EPST method on the operation 12b. If the EPST value for operation 12b happens to be out of date, the call to get_EPST will update the EPST_cache variable to the correct value in the manner described above. In addition, the call to get_EPST may set the check_EPET flag for operation 12b to "true" if it is not already. While the call to get_EPST may set the check_EPET flag "true," as discussed above other changes that might affect the runtime for operation 12b might cause the check_EPET flag to be set "true." At step 144, the get_EPET method determines whether the check_EPET flag is set "true" indicating the cached EPET value for operation 12b may be suspect. If so, then the get_EPET method computes a new value for the EPET_cache variable at step 146, sets the check_EPET flag to "false" at step 148, returns the current EPET value (possibly updated) to the code that called the method at step 150, and the overall process for this call to the get_EPET method ends. If the check_EPET flag is set to "false" at step 144 (i.e. not set to "true"), then the process proceeds directly from step 144 to step 150, where the cached EPET value is simply returned. In one embodiment, material sources 12a answer the get_EPET method with their material availability times.

In one embodiment, at initialization, material sources 12a and customer orders 12a are initialized with their material availability and order due times, respectively. Operations 12b may have both their check_EPET and check_EPST variables set to "true." The EPST_cache variable for each operation 12b should be initialized to an impossible value (i.e. an arbitrary value that an EPST calculation will never produce within the real workflow analysis). This might be, for example, any value less than the material availability times of all material sources 12a. The EPET_cache variable for each operation 12b may be initialized to any arbitrary value.

Figure 6:
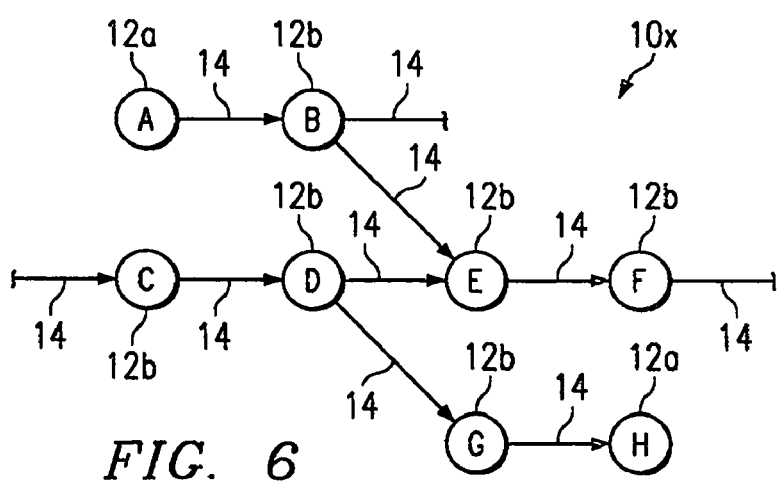
FIG. 6 illustrates a more particular example of an acyclic directed graph structure modeling an example manufacturing process.

As just an example, referring to the example portion of graph structure 10x illustrated in FIG. 6, suppose that the runtime of operation C increases by some relatively significant amount. As an example, a piece of equipment associated with operation C may need maintenance before processing at operation C may continue. Further suppose the set_check_EPET_true method for operation C is called as it should be in this situation. As a result of this call, the check_EPET flag at operation C and the check_EPST flags at operations D, E, F, G, and H are set "true." In addition, suppose that the get_EPET method is subsequently called on operation G. In one embodiment, processing may occur as follows in response to this call, using an abbreviated notation for simplicity and ease of understanding:

G-get_EPET: Call get_EPST on G
   G-get_EPST: Determine G's check_EPST is "true"
   G-get_EPST: Call get_EPET on D
      D-get_EPET: Call get_EPST on D
         D-get_EPST: Determine D's check_EPST is "true"
         D-get_EPST: Call get_EPET on C
            C-get_EPET: Call get_EPST on C
               C-get_EPST: Determine C's check_EPST is "false"
               C-get_EPST: Return C's EPST_cache value
            C-get_EPET: Determine C's check_EPET is "true"
            C-get_EPET: Compute new EPET value for C
            C-get_EPET: Update C's EPET_cache
            C-get_EPET: Set C's check_EPET to "false"
            C-get_EPET: Return C's EPET_cache value
         D-get_EPST: Determine C's EPET+transportation time is the maximum (C is the only node upstream of D to consider)
         D-get_EPST: Assume in this example that the change at C caused maximum to differ from D's EPST_cache value
         D-get_EPST: Set check_EPET "true" on D
         D-get_EPST: Update D's EPST cache to the maximum
         D-get_EPST: Set D's check_EPST to "false"
         D-get_EPST: Return D's EPST_cache value
      D-get_EPET: D's check_EPET already "true"
      D-get_EPET: Compute new EPET value for D
      D-get_EPET: Update D's EPET_cache
      D-get_EPET: Set D's check_EPET to "false"
      D-get_EPET: Return D's EPET_cache value
   G-get_EPST: Determine D's EPET+transportation time is the maximum (D is the only node upstream of G to consider)
   G-get_EPST: Assume the in this example that the change in D's EPET caused maximum to differ from G's EPST_cache value
   G-get_EPST: Set check_EPET "true" on G
   G-get_EPST: Update G's EPST_cache to the maximum
   G-get_EPST: Set G's check_EPST to "false"
   G-get_EPST: Return G's EPST_cache value
G-get_EPET: G's check_EPET already "true"
G-get_EPET: Compute new EPET value for G
G-get_EPET: Update G's EPET_cache
G-get_EPET: Set G's check_EPET to "false"
G-get_EPET: Return G's EPET_cache value In another embodiment, the caching of EPET values may be eliminated, which may eliminate the use of the EPET_cache variable and the check_EPET flag. This may reduce the amount of memory used in the workflow modeling process but may also require more computations to be performed. Assume that EPET values are not cached and that the EPET_cache variable and check_EPET flag are not used. The set_check_EPET_true method may be modified such that, when called on operation 12b, it calls the set_check_EPST_true method recursively on downstream nodes 12 until a node 12 is encountered for which the check_EPST flag is already set to "true." In this case, the set_check_EPET_true method does not set a check_EPET flag for operation 12b to "true," since in this case it is assumed that no such flag exists. As described above, if the check_EPST flag is "true" at a node 12 it will also be "true" at every node 12 downstream of the node 12. The get_EPST method may be modified such that, referring to FIG. 3, rather than comparing at step 120 the maximum determined at step 118 to the cached EPST value for operation 12b, the get_EPST method updates the EPST_cache to the maximum, sets the check_EPST flag "false," and returns the cached EPST value (now updated). The get_EPET method may be modified such that, referring to FIG. 5, after calling the get_EPST on operation 12b at step 142 the get_EPET method computes and returns a new EPET value for operation 12b.

In another embodiment, two additional flags may be used on each edge 14. This may reduce the number of computations that will need to be performed in the workflow modeling process but may require more memory to be used. For purposes of simplicity, these flags will be referred to as the check_upstream and the max_p flags. The check_upstream flag is initially set "true" on all edges 14. In general, this flag is used to mark edges 14 upstream of a node 12 that may affect the EPST of the node 12 and may possibly allow at least some edges 14 whose values have not changed since the EPST was last completed to be ignored. The max_p flag is in general used to mark edges 14 whose upstream nodes 12 are responsible, at least in part, for the EPSTs of their downstream nodes 12.

Figure 7:
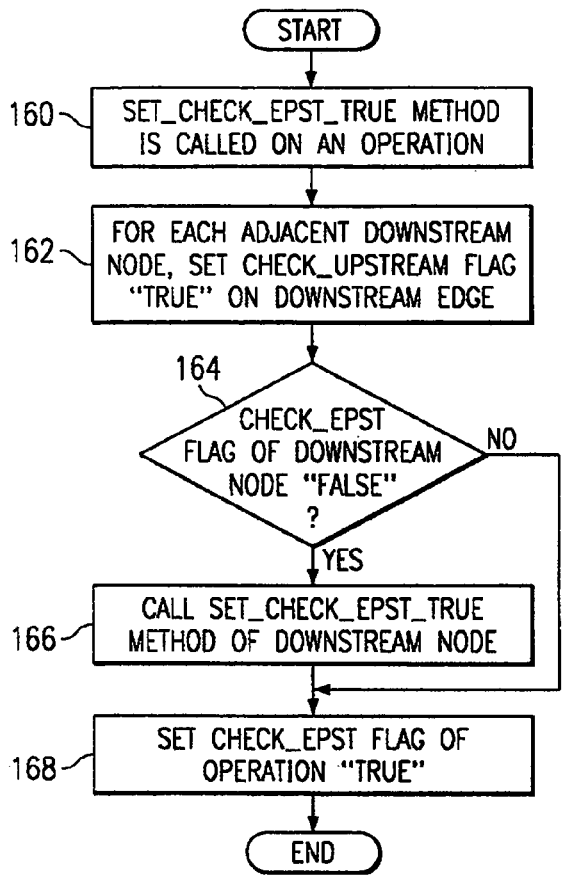
FIG. 7 illustrates an example process associated with the operation of a modified set_check_EPST_true function.

The set_check_EPST_true method may be modified in this case such that, as illustrated in FIG. 7, when called on operation 12b at step 160, for each adjacent downstream node 12 the method sets the check_upstream flag on the corresponding downstream edge 14 to "true" at step 162. If the check_EPST flag of the downstream node 12 is "false" at step 164, then the method calls the set_check_EPST_true method of the downstream node 12 at step 166. This recursively sets all the downstream check_EPST flags to "true." The check_EPST flag of operation 12b is set to "true" at step 168, and the process for this particular call to the set_check_EPST_true method ends. If the check_EPST flag of the downstream node 12 is "true" (i.e. not "false") at step 164, then the process proceeds directly to step 168.

Figure 8:
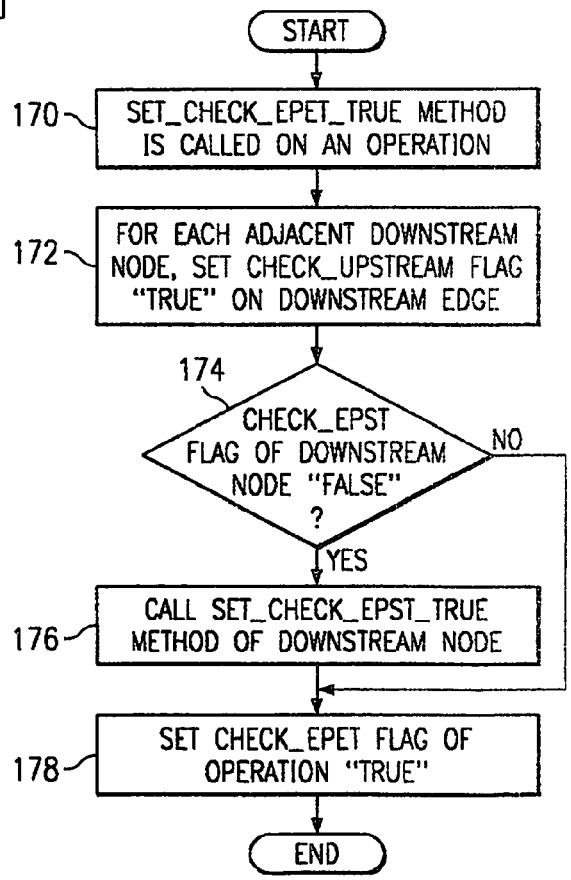
FIG. 8 illustrates an example process associated with the operation of a modified set_check_EPET_true function.

The set_check_EPET_true method may be modified in this case such that, as illustrated in FIG. 8, when called on operation 12b at step 170, for each adjacent downstream node 12 the method sets the check_upstream flag on the corresponding downstream edge 14 to "true" at step 172. If the check_EPST flag of the downstream node 12 is "false" at step 174, then the method calls the set_check_EPST_true method of the downstream node 12 at step 176. This recursively sets all the downstream check_EPST flags to "true." The check_EPET flag of operation 12b is set to "true" at step 178, and the process for this particular call to the set_check_EPET_true method ends. If the check_EPST flag of the downstream node 12 is "true" (i.e. not "false") at step 174, then the process proceeds directly to step 178.

Figure 9A:
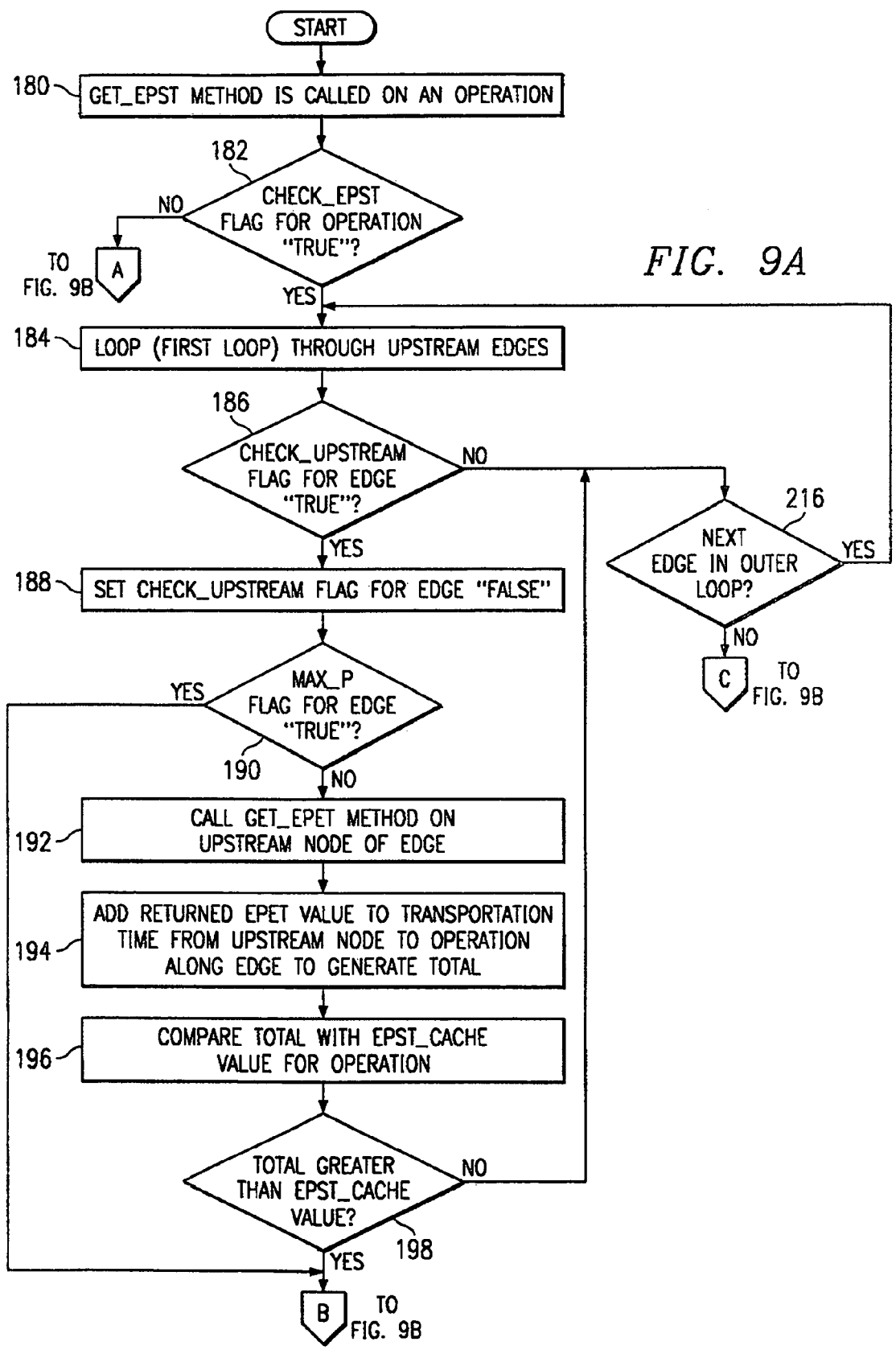
FIGS. 9A and 9B illustrate an example process associated with the operation of a modified get_EPST function
Figure 9B:
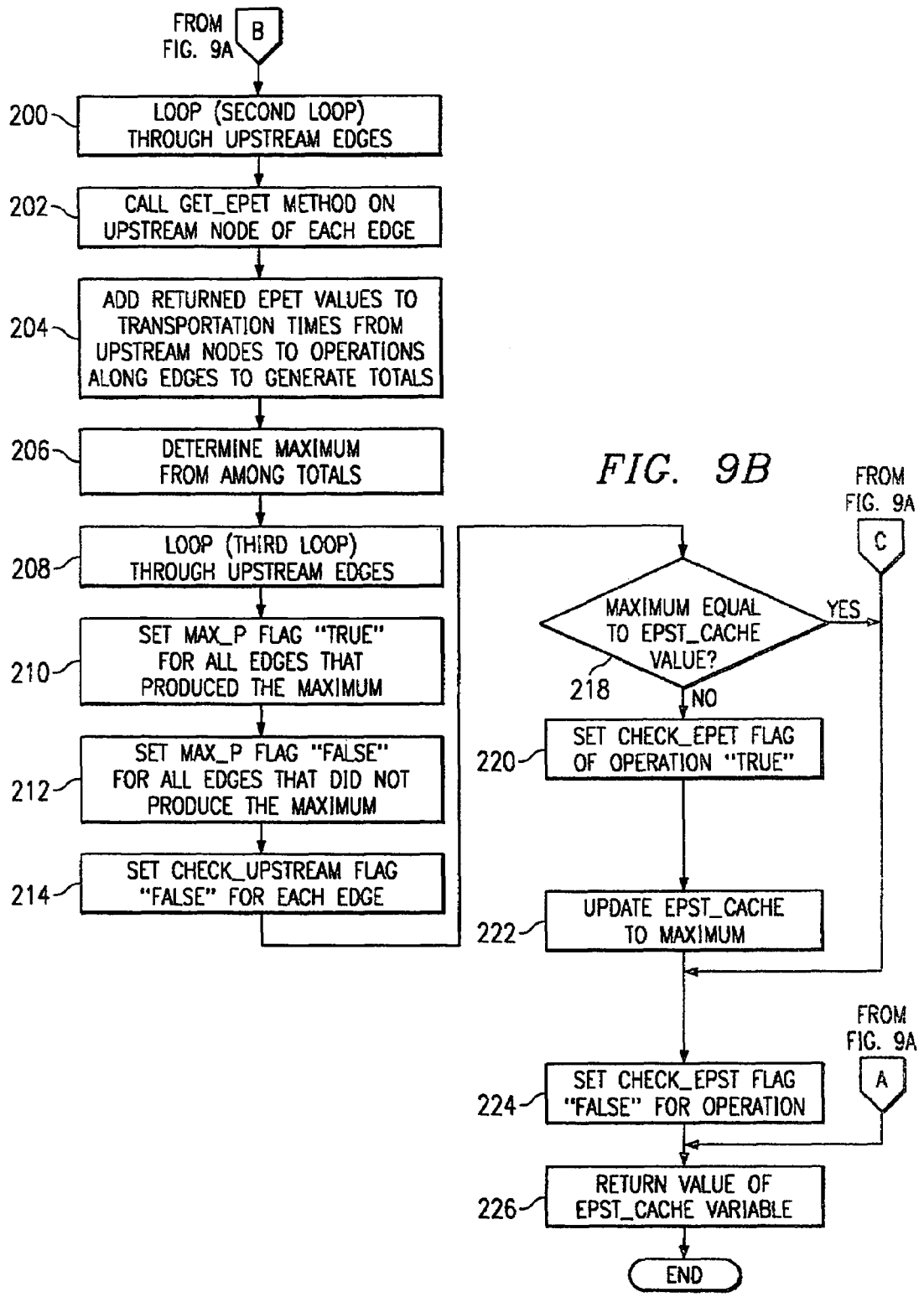

The get_EPST method may be modified in this case as illustrated in FIGS. 9A and 9B. When called on an operation 12b at step 180, the get_EPST method determines whether the check_EPST flag for the operation 12b is set "true" at step 182. If not, then proceed to step 226, where the get_EPST method will simply return the cached EPST value to the code that called the method. If so, then the get_EPST method instead begins a first loop through all the upstream edges 14 at step 184. If the check_upstream flag for a current upstream edge 14 under consideration (within the first loop) is "true" at step 186, the get_EPST method sets that check_upstream flag to "false" at step 188. Otherwise proceed directly to step 216.

If the max_p flag of the edge 14 is "true" at step 190, proceed to step 200, where the get_EPST method has exited the first loop and now enters a second loop through upstream edges 14. If the max_p flag of the edge 14 is not "true" at step 190, the get_EPST method calls the get_EPET method on the upstream node 12 of edge 14 at step 192, adds the returned EPET value to the transportation time from the upstream node 12 to operation 12b along edge 14 to generate a total at step 194, and then compares the total to the EPST_cache value for operation 12b at step 196. At step 198, if the total is greater than the EPST_cache value for operation 12b, then proceed to step 200 where the first loop has been exited and the second loop through upstream edges 14 is entered. Otherwise, proceed to step 216.

The second loop through all upstream edges 14 of operation 12b begins at step 200 and extends through step 206. The get_EPST method calls the get_EPET method on the upstream node 12 of the edge 14 at step 202, adds the returned EPET value to the transportation time from its upstream node 12 to operation 12b along edge 14 to generate a total for each at step 204, and determines the maximum of these totals at step 206. A third loop through all upstream edges 14 of the operation 12b begins at step 208 and extends through step 214. The get_EPST method sets the max_p flag "true" for all the edges 14 that produced the maximum at step 210, sets the max_p flag "false" for all the edges 14 that did not produce the maximum at step 212, sets the check_upstream flag "false" on each edge 14 at step 214, and proceeds to step 218. Steps 202-206 within the second loop may complete for an edge 14 before steps 202-206 begin for the next edge 14, or steps 202-206 for two or more edges 14 may overlap in whole or in part. Steps 210-214 within the third loop may complete for an edge 14 before steps 210-214 begin for the next edge 14, or steps 210-214 for two or more edges 14 may overlap in whole or in part.

At step 216, if there is a next edge 14 within the first loop, then proceed to processing of the next edge 14 at step 186. If there is not a next edge 14 within the first loop at step 216, then proceed to step 224, where the get_EPST method sets the check_EPST flag for operation 12b to "false."

At step 218, the get_EPST method compares the maximum determined at step 206 to the cached EPST value for operation 12b. If the maximum determined at step 206 is different than the cached EPST value for operation 12b at step 218, then the get_EPST method sets the check_EPET flag of operation 12b "true" at step 220 and updates the cached EPST value to the maximum at step 222. Alternatively, if the maximum determined at step 206 is the same as the cached EPST value for operation 12b at step 218, then proceed directly to step 224. The get_EPST method sets the check_EPST flag for operation 12b to "false" at step 224, returns the cached EPST value to the code that called the method at step 226, and the overall process for this particular call to the method ends.

In one embodiment, no modification of the get_EPET method is associated with the addition of check_upstream and max_p flags to upstream edges 14.

The methods described above may provide a "compute on demand" system that is computationally efficient relative to prior techniques. In one embodiment, when code within the system needs the EPST or EPET of an operation 12b, it must call the get_EPST or get_EPET method, respectively, rather than merely obtaining a cached value. Because cached values may not always be up to date for a variety of factors, some of which are described above, directly accessing the caches may not always be guaranteed to provide the correct value. In contrast, the get_EPST and get_EPET methods check appropriate flags and recompute values when it may be necessary, thereby always returning the correct value. When the flags indicate that such recomputation is not necessary, the get_EPST and get_EPET methods simply return the cached values without recomputation. These features may provide certain important technical advantages in terms of speed and computational efficiency. As discussed above, although EPST and EPET values are primarily described in the above examples, the present invention contemplates variants of the above methods and operation with respect to LPST and LPET values or, more broadly, any suitable workflow values, whether or not relating to critical times within a workflow.

As just one example, the present invention might be applied analogously to what is commonly referred to as a "push" manufacturing environment, in which an entity responsible for a workflow will attempt to produce as much as possible of its most profitable product. In such a context, instead of using the techniques disclosed herein for calculating times of interest, one could use these techniques for modeling maximal quantities of such products that can be produced. A calculation similar to that used for deriving EPST, for example, may establish how many units at most of a selected output part could be started at an operation, based on input part availability upstream, or how many of each input part would be required to produce a selected output part. Other data inputs for the modeling process in such a case could include known part breakage rates and initial product losses due to start up problems, which could be factored into a modeling process similar to that used for EPET to determine the maximal number of output parts under particular conditions. Further, it could be the case that certain input parts in this context are manufactured from parts further upstream, thus adding another input variable to the modeling process.

When it is decided how much of a particular high profit output part to produce, the amount of input parts available to make another output part may be diminished as a quantity of input parts is committed to the production steps for the chosen product.

As to the above examples concerning quantity-based (rather than time-based) workflow modeling, changes in upstream or downstream data variables may affect desired workflow modeling results and accuracy (as is true in the analogous time-based examples). Thus, similar techniques may be used to minimize the number of computations for quantity modeling and for time modeling, with the techniques for intelligently reducing redundant or otherwise non-critical recomputations within the critical time modeling process likewise adaptable for critical quantity modeling and for modeling or estimating other workflow variables of interest.

Although the present invention has been described with several embodiments, a plurality of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A process for modeling at least a portion of a workflow for logistics planning of an enterprise, comprising:
    accessing a computer data structure that represents an acyclic directed graph, the acyclic directed graph represents the workflow for logistics planning of the enterprise and comprises a plurality of nodes and one or more edges, each of the edges linking two adjacent nodes within the acyclic directed graph;
    requesting the value of a first function at a selected node, the value of the first function at the selected node depending at least in part on values of the first function at one or more adjacent nodes lying in a first direction from the selected node within the acyclic directed graph, a cached value of at least a second function at the selected node depending only on the value of the first function at the selected node and one or more other values associated with the selected node;
    determining whether a cached value of the first function at the selected node is assured to be valid;
    if the cached value of the first function at the selected node is assured to be valid, then:
    return the cached value of the first function at the selected node without recomputing the value of the first function at the selected node;
    if the cached value of the first function at the selected node is not assured to be valid, then:
    requesting the value of a second function at the adjacent node corresponding to an edge lying in a first direction from the selected node;
    adding the returned value of the second function at the adjacent node to a value associated with movement in a second direction opposite the first direction from the adjacent node to the selected node along the edge, this addition generating a total value for the edge;
    if the total value for the edge is greater than the cached value of the first function at the selected node, then exit the first iteration and perform the second iteration; and
    if the total value for the edge is not greater than the cached value of the first function at the selected node, then either process the next edge within the first iteration or, if there are no more edges to be processed within the first iteration:
    providing an indication associated with the selected node that the cached value of the first function at the selected node is assured to be valid; and
    returning the cached value of the first function at the selected node.

2. The process of claim 1, wherein the workflow comprises a planned flow of resources through a sequence of processing steps to transform less finished resources into more finished resources, the flow of resources being represented by the edges within the acyclic directed graph and giving a time-based directionality to the acyclic directed graph.

3. The process of claim 1, wherein:
    the selected node is associated with a Boolean variable indicating whether the cached value of the first function at the selected node is assured to be valid; and
    determining whether the cached value of the first function at the selected node is assured to be valid comprises determining the value of the Boolean variable at the selected node.

4. The process of claim 1, wherein requesting the value of the first function at the selected node comprises calling a corresponding node-local method of the selected node, the node-local method determining whether the cached value of the function at the selected node is assured to be valid and returning either the recomputed value or the cached value, as appropriate, of the function at the selected node.

5. The process of claim 1, further comprising imposing an indication of possible invalidity on the cached values of the first function at all nodes in a second direction from the selected node in response to determining that the cached value of the first function at the selected node is not assured to be valid, the second direction being the opposite direction from the first direction.

6. The process of claim 1, wherein the value of the first function at the selected node is selected from the group consisting of:
    a value of an earliest possible starting time (EPST) for a portion of the workflow associated with the selected node;
    a value of an EPET for a portion of the workflow associated with the selected node;
    a value of a latest possible starting time (LPST) for a portion of the workflow associated with the selected node; and
    a value of an LPET for a portion of the workflow associated with the selected node.

7. The process of claim 1, wherein the value of the first function at the selected node is selected from the group consisting of:
    a maximum quantity of an output of a portion of the workflow associated with the selected node for which production can be started, given an available supply of at least one input at a selected time; and
    a maximum quantity of an output of a portion of the workflow associated with the selected node for which production can be completed, given an available supply of at least one input at a selected time.

8. The process of claim 1, wherein the value of the first function at the selected node is selected from the group consisting of:
    a minimum quantity of an input required to start production within at least a portion of the workflow, given a desired minimum quantity of an output that is to be produced by that portion of the workflow by a specified time;
    a minimum quantity of an input required to complete production within at least a portion of the workflow, given a desired minimum quantity of an output that is to be produced by that portion of the workflow by a specified time.

9. The process of claim 1, wherein the process is implemented using at least one component selected from the group consisting of a planner, a scheduler, and an optimizer.

10. A computer-implemented system for modeling at least a portion of a workflow for logistics planning of an enterprise, the system operating on one more computer processors collectively operable to:

access a computer data structure that represents an acyclic directed graph, the acyclic directed graph represents the workflow for logistics planning of the enterprise and comprises a plurality of nodes and one or more edges, each of the edges linking two adjacent nodes within the acyclic directed graph;

request the value of a first function at a selected node, the value of the first function at the selected node depending at least in part on values of the first function at one or more adjacent nodes lying in a first direction from the selected node within the acyclic directed graph, a cached value of at least a second function at the selected node depending only on the value of the first function at the selected node and one or more other values associated with the selected node;

determine whether a cached value of the first function at the selected node is assured to be valid;

if the cached value of the first function at the selected node is assured to be valid, then:

return the cached value of the first function at the selected node without recomputing the value of the first function at the selected node;

if the cached value of the first function at the selected node is not assured to be valid, then:

requesting the value of a second function at the adjacent node corresponding to an edge lying in a first direction from the selected node;

adding the returned value of the second function at the adjacent node to a value associated with movement in a second direction opposite the first direction from the adjacent node to the selected node along the edge, this addition generating a total value for the edge;

if the total value for the edge is greater than the cached value of the first function at the selected node, then exit the first iteration and perform the second iteration; and if the total value for the edge is not greater than the cached value of the first function at the selected node, then either process the next edge within the first iteration or, if there are no more edges to be processed within the first iteration:

provide an indication associated with the selected node that the cached value of the first function at the selected node is assured to be valid; and return the cached value of the first function at the selected node.

11. The system of claim 10, wherein the workflow comprises a planned flow of resources through a sequence of processing steps to transform less finished resources into more finished resources, the flow of resources being represented by the edges within the acyclic directed graph and giving a time-based directionality to the acyclic directed graph.

12. The system of claim 10, wherein:

the selected node is associated with a Boolean variable indicating whether the cached value of the first function at the selected node is assured to be valid; and determining whether the cached value of the first function at the selected node is assured to be valid comprises determining the value of the Boolean variable at the selected node.

13. The system of claim 10, wherein requesting the value of the first function at the selected node comprises calling a corresponding node-local method of the selected node, the node-local method determining whether the cached value of the function at the selected node is assured to be valid and returning either the recomputed value or the cached value, as appropriate, of the function at the selected node.

14. The system of claim 10, wherein the one or more computer processors are further operable to impose an indication of possible invalidity on the cached values of the first function at all nodes in a second direction from the selected node in response to determining that the cached value of the first function at the selected node is not assured to be valid, the second direction being the opposite direction from the first direction.

15. The system of claim 10, wherein the value of the first function at the selected node is selected from the group consisting of:

a value of an earliest possible starting time (EPST) for a portion of the workflow associated with the selected node;

a value of an EPET for a portion of the workflow associated with the selected node, node;

a value of a latest possible starting time (LPST) for a portion of the workflow associated with the selected node; and a value of an LPET for a portion of the workflow associated with the selected node, node.

16. The system of claim 10, wherein the value of the first function at the selected node is selected from the group consisting of:

a maximum quantity of an output of a portion of the workflow associated with the selected node for which production can be started, given an available supply of at least one input at a selected time; and a maximum quantity of an output of a portion of the workflow associated with the selected node for which production can be completed, given an available supply of at least one input at a selected time.

17. The system of claim 10, wherein the value of the first function at the selected node is selected from the group consisting of:

a minimum quantity of an input required to start production within at least a portion of the workflow, given a desired minimum quantity of an output that is to be produced by that portion of the workflow by a specified time; and a minimum quantity of an input required to complete production within at least a portion of the workflow, given a desired minimum quantity of an output that is to be produced by that portion of the workflow by a specified time.

18. The system of claim 10, wherein the process is implemented using at least one component selected from the group consisting of a planner, a scheduler, and an optimizer.

19. A method of modeling at least a portion of a workflow for logistics planning of an enterprise, comprising:

accessing a computer data structure that represents an acyclic directed graph, the acyclic directed graph represents the workflow for logistics planning of the enterprise and comprises a plurality of nodes and one or more edges, each of the edges linking two adjacent nodes within the acyclic directed graph, the acyclic directed graph having a time-based directionality;

requesting the value of a first function at a selected node, the value of the first function at the selected node depending at least in part on values of the first function at one or more adjacent nodes lying in a first direction from the selected node;

determining whether a cached value of the first function at the selected node is assured to be valid;

if the cached value of the first function at the selected node is assured to be valid, then:

return the cached value of the first function at the selected node without recomputing the value of the first function at the selected node; and if the cached value of the first function at the selected node is not assured to be valid, then:

perform a first iteration through the edges lying in the first direction from the selected node, the first iteration comprising:

determining whether an edge might make invalid the value of the first function at the selected node;

if the edge will not make invalid the value of the first function at the selected node, then either processing the next edge within the first iteration or, if there are no more edges to be processed within the first iteration, providing an indication associated with the selected node that the cached value of the first function at the selected node is assured to be valid and returning the cached value of the first function at the selected node;

if the edge might make invalid the value of the first function at the selected node, then providing an indication associated with the edge that the edge does not make invalid the value of the first function at the selected node;

if the edge corresponds to an adjacent node lying in the first direction from the selected node that is at least partially responsible for the value of the first function at the selected node, then exit the first iteration and perform a second iteration through the edges lying in the first direction from the selected node; and if the edge corresponds to an adjacent node lying in the first direction from the selected node that is not at least partially responsible for the value of the first function at the selected node, then:

requesting the value of a second function at the adjacent node corresponding to the edge;

adding the returned value of the second function at the adjacent node to a value associated with movement in a second direction opposite the first direction from the adjacent node to the selected node along the edge, this addition generating a total value for the edge;

if the total value for the edge is greater than the cached value of the first function at the selected node, then exit the first iteration and perform the second iteration; and if the total value for the edge is not greater than the cached value of the first function at the selected node, then either process the next edge within the first iteration or, if there are no more edges to be processed within the first iteration, providing an indication associated with the selected node that the cached value of the first function at the selected node is assured to be valid and returning the cached value of the first function at the selected node;

the second iteration through the edges lying in the first direction from the selected node comprising:

requesting the value of the second function at the adjacent nodes corresponding to the edges;

adding the returned values of the second function at the adjacent nodes to the values associated with movement in the second direction from the adjacent nodes to the selected node along the edges to generate total values for the edges;

determining a maximum total value over all the adjacent nodes;

perform a third iteration through the edges lying in the first direction from the selected node comprising:

providing an indication associated with all edges that produced the maximum total value that these edges are at least partially responsible for the value of the first function at the selected node;

providing an indication associated with all edges that did not produce the maximum total value that these edges are not at least partially responsible for the value of the first function at the selected node; and providing an indication associated with each edge that the edge will not make invalid the value of the first function at the selected node;

if the maximum total value is equal to the cached value of the first function at the selected node, then:

providing an indication that the cached value of the first function is valid; and returning the cached value of the first function at the selected node without recomputing the value of the first function at the selected node; and if the maximum total value is different from the cached value of the first function at the selected node, then:

providing an indication that the cached value of the second function is not valid;

updating the cached value of the first function at the selected node to the maximum total value;

providing an indication associated with the selected node that the cached value of the first function at the selected node is assured to be valid; and returning the cached value of the first function at the selected node.

20. The method of claim 19, wherein:

the value of the first function at a node comprises an earliest possible start time for a manufacturing operation represented by the node; and the value of the second function at a node comprises an earliest possible end time for a manufacturing operation represented by the node.

* * * * *

UNITED STATES PATENT AND TRADEMARK OFFICE
CERTIFICATE OF CORRECTION

PATENT NO. : 7,577,554 B2
APPLICATION NO. : 11/120588
DATED : August 18, 2009
INVENTOR(S) : Lystad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1120 days.

Signed and Sealed this

Fourteenth Day of December, 2010

David J. Kappos
*Director of the United States Patent and Trademark Office*